US012246428B2

(12) United States Patent
Yoshikane et al.

(10) Patent No.: US 12,246,428 B2
(45) Date of Patent: Mar. 11, 2025

(54) STRIKING TOOL

(71) Applicant: MAKITA CORPORATION, Anjo (JP)

(72) Inventors: Kiyonobu Yoshikane, Anjo (JP); Mizuki Yamamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 403 days.

(21) Appl. No.: 17/701,074

(22) Filed: Mar. 22, 2022

(65) Prior Publication Data

US 2022/0314414 A1 Oct. 6, 2022

(30) Foreign Application Priority Data

Apr. 5, 2021 (JP) ................................ 2021-064335

(51) Int. Cl.
*B25D 17/08* (2006.01)

(52) U.S. Cl.
CPC .... *B25D 17/088* (2013.01); *B25D 2217/0042* (2013.01); *Y10T 279/17076* (2015.01)

(58) Field of Classification Search
CPC .......... B25D 17/088; B25D 2217/0042; B25D 17/084; Y10T 279/17076; Y10T 279/17085
See application file for complete search history.

(56) References Cited

U.S. PATENT DOCUMENTS

2008/0197583 A1* 8/2008 Furusawa ............ B25D 17/088 279/30
2010/0176561 A1* 7/2010 Braun .................. B25D 17/088 279/82

FOREIGN PATENT DOCUMENTS

JP 4949886 B2 6/2012

* cited by examiner

*Primary Examiner* — Eric A. Gates
*Assistant Examiner* — Eric Daniel Whitmire
(74) *Attorney, Agent, or Firm* — Oliff PLC

(57) ABSTRACT

Two balls can reliably retract for smooth insertion of a tip tool into a tool holder. A hammer drill includes a tool holder, two balls in reception holes in the tool holder, a guide washer urging the balls forward in the reception holes with a coil spring, a pressure ring adjacent to a front of the guide washer, and an operation sleeve allowing the pressure ring to move backward and forward between locked and unlocked positions of the two balls. The guide washer includes, on its front surface, a projection toward the pressure ring to cause, with the pressure ring at the locked position, the guide washer to be inclined with respect to an axis of the tool holder for a first ball to move more backward than a second ball.

20 Claims, 5 Drawing Sheets

STRIKING TOOL

CROSS-REFERENCE TO RELATED APPLICATIONS

This application claims the benefit of priority to Japanese Patent Application No. 2021-064335, filed on Apr. 5, 2021, the entire contents of which are hereby incorporated by reference.

BACKGROUND

1. Technical Field

The present disclosure relates to a striking tool such as an electric hammer and a hammer drill.

2. Description of the Background

A striking tool such as an electric hammer and a hammer drill converts the rotation of a motor into reciprocation of a piston back and forth through, for example, a crank assembly in a housing. A striker that reciprocates back and forth together with the piston strikes a rear end of a tip tool attached to a tool holder directly or indirectly through an intermediate member.

The striking tool includes, at a distal end of the housing, a chuck assembly (attachment portion) for receiving the tip tool inserted in the tool holder. As described in Japanese Patent No. 4949886 (hereafter, Patent Literature 1), the attachment portion accommodates, in a pair of reception holes formed through the tool holder, a pair of balls movable in the axial and radial directions of the tool holder. The balls are urged forward in the reception holes by a guide washer (abutting member) that is urged forward by a coil spring. A pressure ring is externally mounted on the tool holder. The pressure ring is movable backward and forward between a locked position and an unlocked position. At the locked position, the pressure ring is located outside the balls and causes the balls to protrude into the tool holder. At the unlocked position, the pressure ring is retracted backward from outside the balls and permits the balls to retract from inside the tool holder. The pressure ring is held on an inner circumference of an operation sleeve and is urged to the locked position by the coil spring. With the operation sleeve moved backward, the pressure ring slides to the unlocked position, thus allowing the tip tool to be attachable and detachable.

The guide washer has a conical receiver that protrudes rearward toward its center. The receiver has a retracted portion as a recess on its surface. The retracted portion protrudes rearward at a smaller angle with an axis of the tool holder than the other portions of the tool holder. With the retracted portion engaged with a lower ball, the two balls are displaced from each other in the front-rear direction.

In the attachment portion, a rear end of the tip tool is inserted into the tool holder to cause an upper ball to move into a space between the pressure ring and the receiver and retract from inside the tool holder. This causes the guide washer to tilt. When the tip tool is moved further backward, the lower ball also moves into a space between the pressure ring and the receiver and retracts from inside the tool holder. When rectangular grooves on the outer circumference of the tip tool reach the positions of the balls, the coil spring urges the two balls to move forward and engage with the rectangular grooves. This integrates the tip tool with the tool holder in the rotational direction. Thus, the tool holder can receive the tip tool simply by pressing the tip tool inserted, rather than by moving the operation sleeve backward.

BRIEF SUMMARY

With the technique described in Patent Literature 1, the retracted portion of the guide washer allows the balls to displace. The ball may not retract smoothly into the retracted portion when the tip tool is inserted. The retracted portion may protrude more rearward to allow the ball to move greatly. In this state, however, the tip tool pressed further may apply a greater force in the radial direction of the guide washer than a force in the pressing direction in which the guide washer is pressed through the retracted portion. This may prevent the tip tool from being pressed further.

One or more aspects of the present disclosure are directed to a striking tool that allows two balls to reliably retract to allow a tool holder to smoothly receive a tip tool inserted.

An aspect of the present disclosure provides a striking tool, including:

a tool holder being cylindrical and configured to receive a rear end of a tip tool at a front of the tool holder, the tool holder having a pair of reception holes extending radially;

two balls movable backward and forward in the pair of reception holes in an axial direction of the tool holder, the two balls being movable into and out of an area adjacent to an axis of the tool holder;

an abutting member being a ring, the abutting member being externally mounted on the tool holder in a manner movable backward and forward;

an urging member between the tool holder and the abutting member, the urging member urging the two balls forward in the reception holes with the abutting member;

a pressure ring externally mounted on the tool holder, the pressure ring being movable backward and forward, the pressure ring adjacent to a front of the abutting member, the pressure ring being urged forward by the urging member;

an operation sleeve externally mounted on the tool holder, the operation sleeve being movable backward and forward between a locked position being forward and an unlocked position being backward, at the locked position, the operation sleeve having an inner circumference of the operation sleeve in contact with the pressure ring, the pressure ring being located outside the two balls in front portions of the reception holes to cause the two balls to protrude toward the axis of the tool holder, at the unlocked position, the operation sleeve allowing the pressure ring to move backward from a position outside the two balls to permit the two balls to retract from a protruding position at which the two balls protrude into the tool holder; and a projection between the abutting member and the pressure ring, the projection being configured to cause, with the pressure ring at the locked position, the abutting member to be in an inclined posture with respect to the axis of the tool holder to allow a first ball of the two balls to move more backward than a second ball of the two balls.

The striking tool according to the above aspect of the present disclosure allows the two balls to reliably retract to allow the tool holder to smoothly receive the tip tool inserted.

DETAILED DESCRIPTION

Embodiments of the present disclosure will now be described with reference to the drawings.

Figure 1:
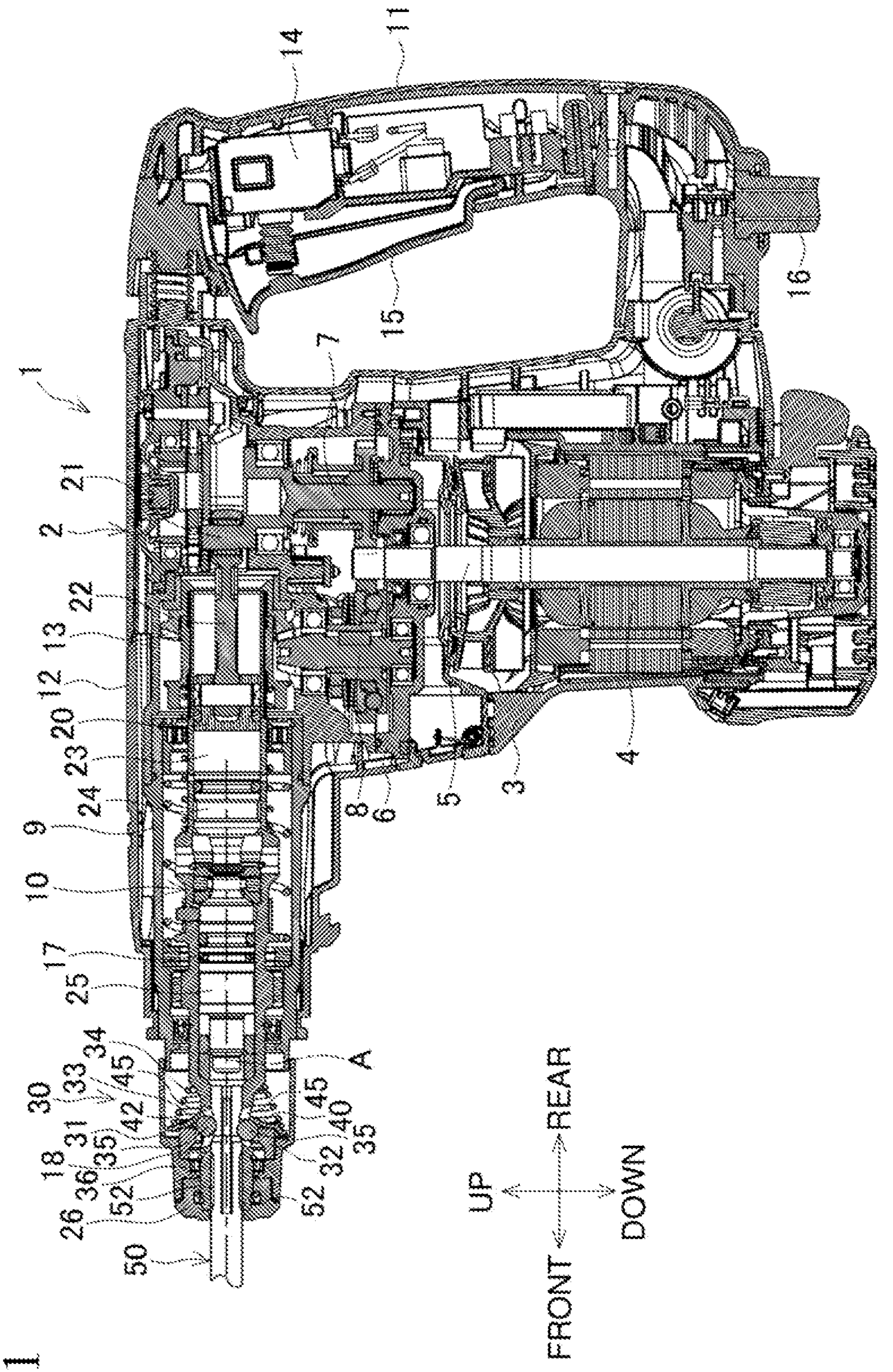
FIG. 1 is a longitudinal central sectional view of a hammer drill.

FIG. 1 is a longitudinal central sectional view of a hammer drill 1 as an example of a striking tool.

The hammer drill 1 includes a body housing 2 and a motor housing 3. The motor housing 3 is connected to a front lower portion of the body housing 2 in the vertical direction. The motor housing 3 accommodates a motor 4 with its output shaft 5 facing upward. The body housing 2 includes a gear housing 6 above the motor housing 3. The gear housing 6 includes a crank shaft 7 and a countershaft 8. The crank shaft 7 and the countershaft 8 are parallel to each other and mesh with the output shaft 5. A front housing 9 is joined to the front of the gear housing 6. The front housing 9 is cylindrical and extends frontward. The front housing 9 coaxially supports a cylindrical tool holder 10 inside in a rotatable manner. The body housing 2 includes a handle housing 11 connected to its rear. The body housing 2 includes a housing cover 12 connected to its front. The housing cover 12 covers the front housing 9.

The countershaft 8 meshes with a bevel gear 13 located on the rear end of the tool holder 10. The handle housing 11 includes a switch 14 and a switch lever 15. The handle housing 11 has its lower portion connected to a power cable 16.

The tool holder 10 includes a larger-diameter portion 17 and a smaller-diameter portion 18. The larger-diameter portion 17 is located inside the front housing 9. The smaller-diameter portion 18 is at the front end of the larger-diameter portion 17 and is tapered frontward to protrude from the front housing 9. An attachment portion 30 (described later) is mounted on the smaller-diameter portion 18. The attachment portion 30 receives a tip tool 50 inserted.

The larger-diameter portion 17 includes a piston 20. The piston 20 is connected to an eccentric pin 21 on the crank shaft 7 with a connecting rod 22. The larger-diameter portion 17 accommodates, in front of the piston 20, a striker 24 with an air chamber 23 between them. The larger-diameter portion 17 accommodates an intermediate member 25 in front of the striker 24.

The body housing 2 receives a change lever (not shown) on its left side surface. The change lever is operable to select a mode from three modes, or a hammer mode, a hammer drill mode, and a drill mode. In the hammer mode, the crank shaft 7 rotates to strike the tip tool 50, with the tool holder 10 locked to be nonrotatable. In the hammer drill mode, the crank shaft 7 and the countershaft 8 rotate together to strike and rotate the tip tool 50. In the drill mode, the countershaft 8 rotates to rotate the tip tool 50 together with the tool holder 10 without striking the tip tool 50.

Figure 2A:
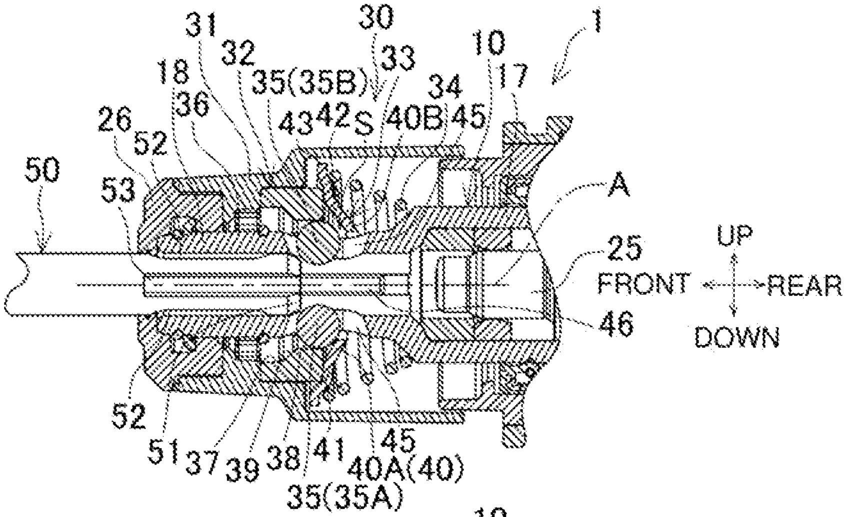
FIG. 2A is a view of the hammer drill yet to receive a tip tool.

As shown in FIG. 2A, the smaller-diameter portion 18 of the tool holder 10 receives an annular rubber stopper 26 on its distal end. The attachment portion 30 is located between the rubber stopper 26 and the front housing 9. The attachment portion 30 includes an operation sleeve 31, a pressure ring 32, a guide washer 33, a coil spring 34, and two balls 35. To vertically distinguish the balls 35 from each other, the lower ball 35 is referred to as a ball 35A and the upper ball 35 is referred to as a ball 35B.

The operation sleeve 31 is externally mounted on the smaller-diameter portion 18 between the rubber stopper 26 and the front housing 9. The operation sleeve 31 is movable backward and forward. The operation sleeve 31 includes an annular stopper 36 on its inner circumference. The stopper 36 is in contact with the rubber stopper 26 at an advanced position of the operation sleeve 31.

The pressure ring 32 is externally mounted on the smaller-diameter portion 18 inside the operation sleeve 31. The pressure ring 32 has its inner circumference being stepped. More specifically, the inner circumference includes a front enlarged-diameter portion 37, a rear reduced-diameter portion 38, and a tapered portion 39 as an intermediate portion connecting the enlarged-diameter portion 37 and the reduced-diameter portion 38 together. The pressure ring 32 is movable backward and forward inside the operation sleeve 31. The pressure ring 32 is restricted from advancing at a position at which the pressure ring 32 comes in contact with the stopper 36.

Figures 4A, 4B, 4C:
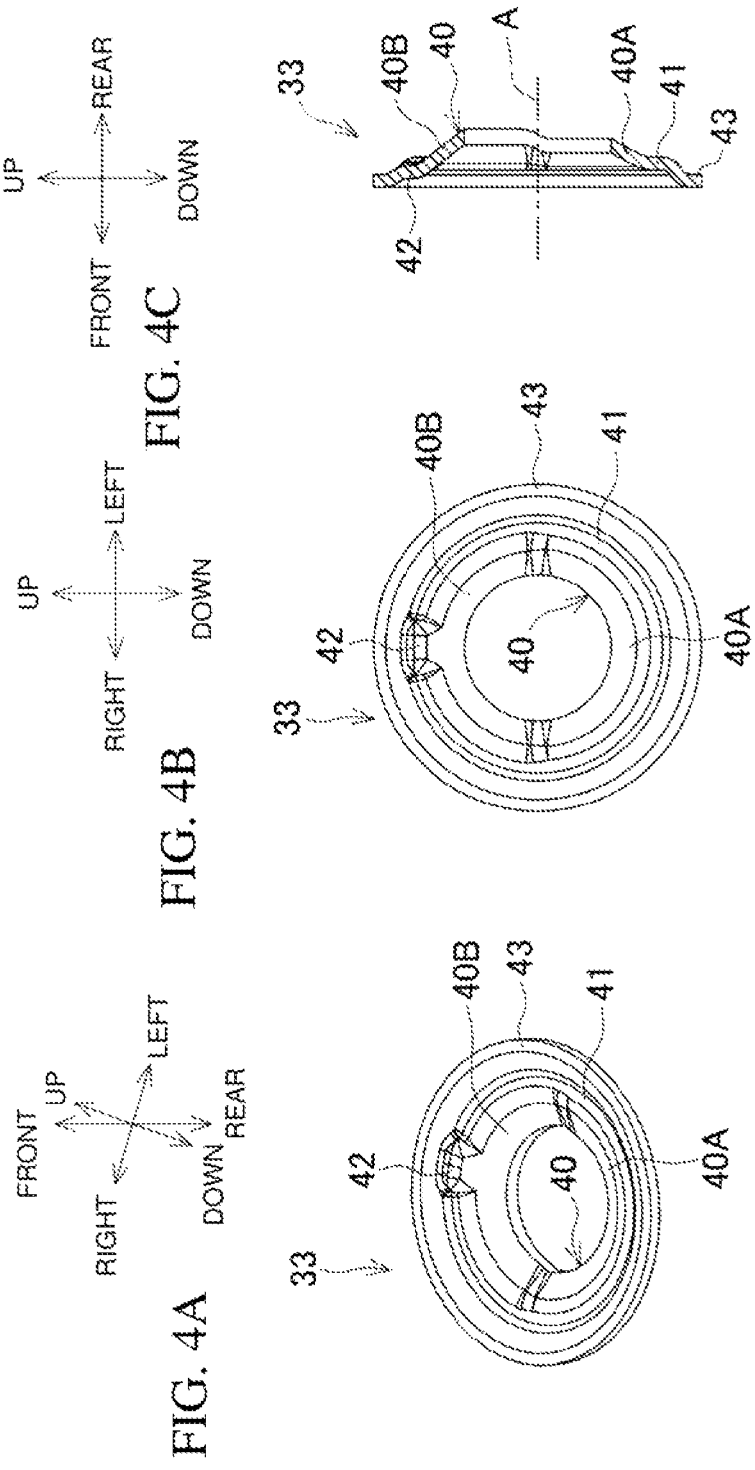
FIG. 4A is a front perspective view of a guide washer.
FIG. 4B is a front view of the guide washer.
FIG. 4C is a longitudinal central sectional view of the guide washer.

The guide washer 33 is a disk externally mounted on the smaller-diameter portion 18 inside the operation sleeve 31. The guide washer 33 has a larger diameter than the pressure ring 32. The guide washer 33 has its central portion serving as a conical receiver 40 that protrudes rearward from its outer circumference toward its center. The receiver 40 has an uneven conical shape along its entire circumference. As shown in FIG. 4C as well, the receiver 40 is shaped vertically unevenly with its upper half 40B to reduce an angle with an axis A of the tool holder 10 than its lower half 40A. Thus, the upper half 40B protrudes more rearward than the lower half 40A.

The receiver 40 has an inner flat surface 41 on its outer circumference. The inner flat surface 41 is a ring orthogonal to the axis A. The inner flat surface 41 has, at its upper lateral center, a projection 42 protruding frontward. The guide washer 33 has an outer flat surface 43 on its outermost circumference. The outer flat surface 43 is orthogonal to the axis A.

The coil spring 34 is externally mounted on the smaller-diameter portion 18 between the front end of the larger-diameter portion 17 and the guide washer 33 in the tool holder 10. The coil spring 34 is conical and has its diameter decreasing rearward from its front end. The coil spring 34 has its front end in contact with the rear surface of the outer flat surface 43 of the guide washer 33. The coil spring 34 has its rear end in contact with the front end of the larger-diameter portion 17.

The coil spring 34 thus urges the guide washer 33 forward. The coil spring 34 then urges the pressure ring 32 and the operation sleeve 31 forward through the guide washer 33.

In a non-operating state shown in FIG. 2A, the operation sleeve 31 is urged by the coil spring 34 to its advanced position at which the operation sleeve 31 is in contact with the rubber stopper 26. The pressure ring 32 is at its advanced position at which the pressure ring 32 is in contact with the stopper 36 in the operation sleeve 31. The guide washer 33 is at its advanced position at which the pressure ring 32 is in contact with, on its rear surface, the inner flat surface 41.

The pressure ring 32 has its upper rear surface in contact with the projection 42 on the guide washer 33. Thus, the guide washer 33, at its advanced position, is in contact with the pressure ring 32 in an inclined posture with its upper portion located more rearward than a lower portion of the guide washer 33, rather than in a posture with the guide washer 33 coaxial with the axis A.

The smaller-diameter portion 18 of the tool holder 10 has a pair of reception holes 45. The reception holes 45 are located point-symmetric to each other about the axis A. The reception holes 45 extend radially through the smaller-diameter portion 18. The reception holes 45 are elongated in the front-rear direction with their front and rear ends sloped from the outer surface of the smaller-diameter portion 18 toward the axis A. The smaller-diameter portion 18 has, on its inner circumference, a pair of ridges 46 extending in the front-rear direction and located at positions circumferentially shifted by 90° from the positions of the reception holes 45.

The balls 35 received in the reception holes 45 can roll backward and forward in the reception holes 45. Each ball 35 can also roll radially in the corresponding reception hole 45. Each ball 35 can roll, in an area adjacent to the axis of the smaller-diameter portion 18, to a position at which the ball 35 partially protrudes into the smaller-diameter portion 18. With the operation sleeve 31 and the pressure ring 32 at their advanced positions (locked positions) as shown in FIG. 2A, the reduced-diameter portion 38 of the pressure ring 32 is located outside the balls 35. This structure locks the balls 35 at a protruding position at which the balls 35 protrude into the smaller-diameter portion 18 and restricts the balls 35 from moving radially outward.

In this state, the lower half 40A of the receiver 40 in the guide washer 33 is in contact with the lower ball 35A. The ball 35A is thus locked, in a front portion of the reception hole 45, at the protruding position at which the ball 35A protrudes into the smaller-diameter portion 18.

The upper half 40B of the receiver 40 having a larger inclination angle inclines more rearward than the lower half 40A. This defines a relief space S between the pressure ring 32 and the upper half 40B to allow the ball 35B to move backward. When the ball 35B moves backward and comes in contact with the upper half 40B, the ball 35B remains in contact with the reduced-diameter portion 38 of the pressure ring 32. This maintains the ball 35B at the protruding position at which the ball 35B protrudes into the smaller-diameter portion 18.

The tip tool 50 has, at its rear end, a tapered end 51 that is tapered rearward. The tip tool 50 has, on the outer circumference of its rear end, a pair of rectangular grooves 52 at the positions point-symmetric to each other about its axis. Each rectangular groove 52 extends in the front-rear direction. The tip tool 50 has, on the outer circumference of its rear end, a pair of engagement grooves 53 at positions circumferentially shifted by 90° from the rectangular grooves 52. Each engagement groove 53 extends frontward from the rear end of the tip tool 50.

Figure 2B:
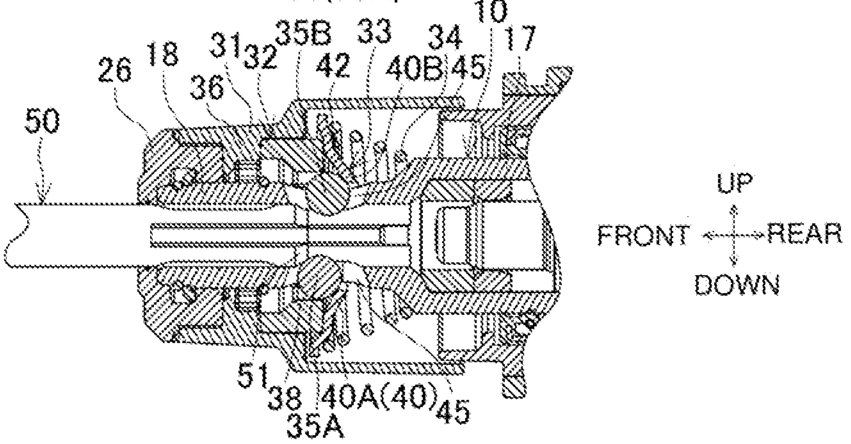
FIG. 2B is a view of the hammer drill pressed initially to receive the tip tool.

When the attachment portion 30 receives the tip tool 50 inserted as shown in FIG. 2A, the engagement grooves 53 are aligned with the ridges 46 on the smaller-diameter portion 18 with the operation sleeve 31 at its advanced position. In this state, the rear end of the tip tool 50 is inserted in the smaller-diameter portion 18. Then, the tapered end 51 of the tip tool 50 comes in contact with the balls 35A and 35B. In this state, the relief space S behind the upper ball 35B allows the ball 35B to move backward in the reception hole 45 while the ball 35B remains in contact with the pressure ring 32. As shown in FIG. 2B, the ball 35B moves backward until the ball 35B comes in contact with the upper half 40B of the receiver 40 with its center located rearward from the rear end of the pressure ring 32. This structure allows the tip tool 50 to move backward.

Figure 2C:
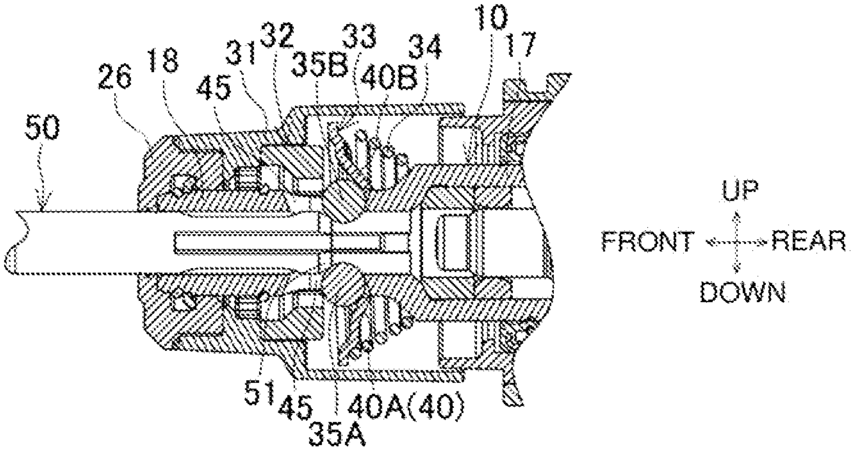
FIG. 2C is a view of the hammer drill pressed further to receive the tip tool.

When the tip tool 50 continues to move backward as shown in FIG. 2C, the lower ball 35A is pressed by the tapered end 51 of the tip tool 50 to move backward in the reception hole 45. The ball 35A then moves into a space between the pressure ring 32 and the lower half 40A of the receiver 40. The ball 35A thus moves the lower portion of the guide washer 33 backward. The upper ball 35B is then also pressed by the tapered end 51 to move backward in the reception hole 45. The ball 35B then moves into a space between the pressure ring 32 and the upper half 40B of the receiver 40. The ball 35B thus moves the upper portion of the guide washer 33 backward.

Figure 3A:
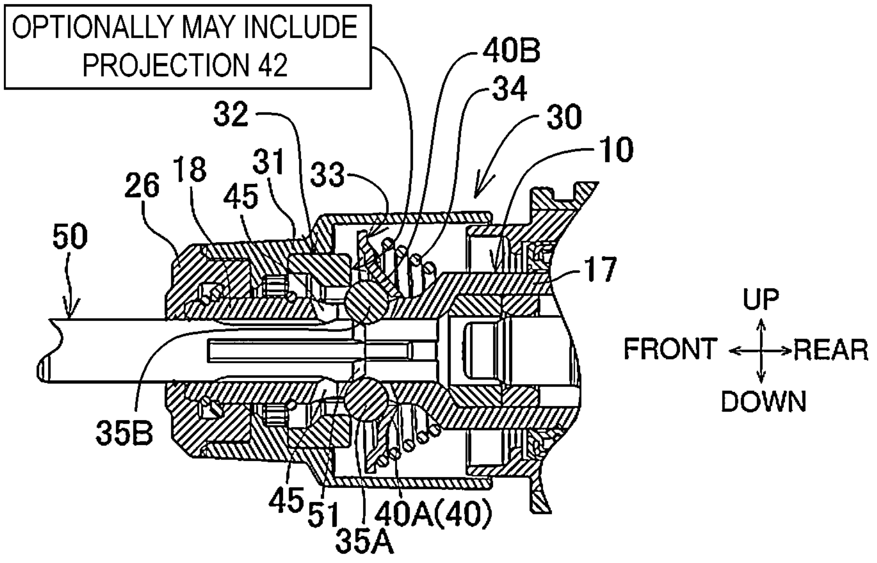
FIG. 3A is a view of the hammer drill in the state shown in FIG. 2C pressed still further to receive the tip tool in which two balls move onto a tapered end.

When the tip tool 50 moves further backward as shown in FIG. 3A, the balls 35A and 35B move radially outward between the pressure ring 32 and the guide washer 33 while moving on the tapered end 51 in a manner relative to each other. The pressure ring 32 remaining in contact with the balls 35A and 35B does not move backward with the hammer drill 1 facing upward.

Figure 3B:
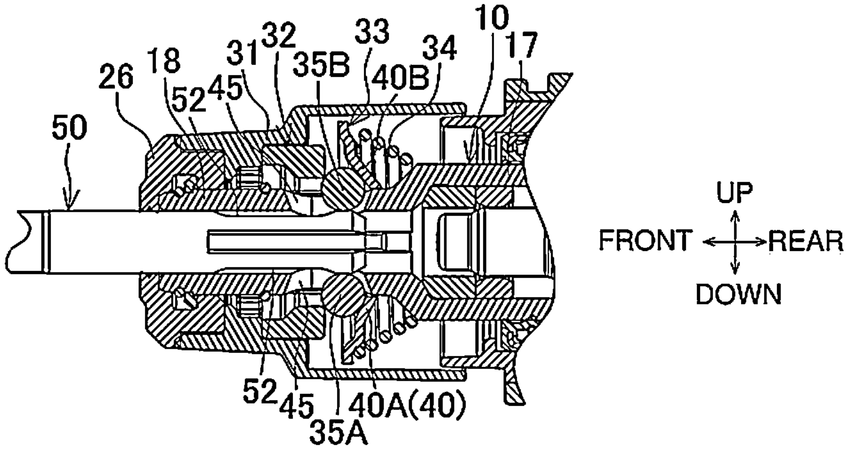
FIG. 3B is a view of the hammer drill pressed still further to receive the tip tool in which the two balls move onto an outer circumference of the tip tool.
Figure 3C:
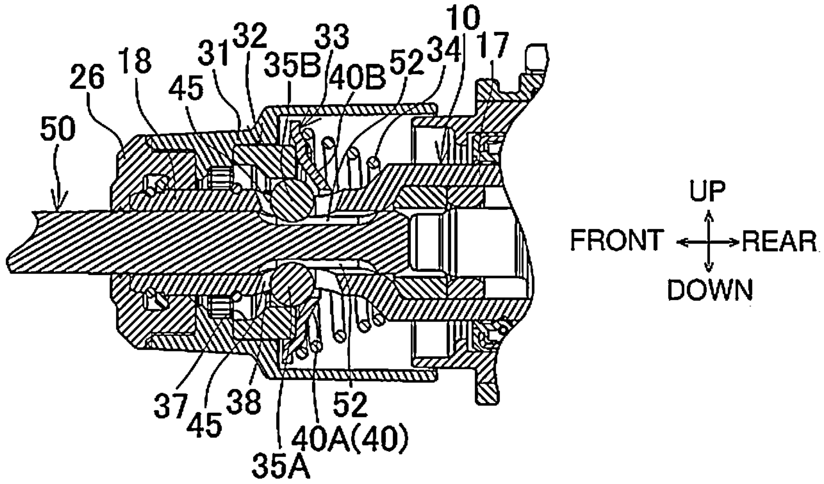
FIG. 3C is a view of the hammer drill pressed still further to receive the tip tool in which the two balls engage with rectangular grooves.

When the tip tool 50 moves further backward as shown in FIG. 3B, the balls 35A and 35B move over the tapered end 51 in a manner relative to each other, and then move on the rear end circumferential surface of the tip tool 50, retracting radially outward from the reception holes 45. When the tip tool 50 moves further backward, the rectangular grooves 52 reach radially inward portions of the balls 35A and 35B. As shown in FIG. 3C, the balls 35A and 35B pressed by the receiver 40 in the guide washer 33 move inside the pressure ring 32, returning to the protruding position at which the balls 35A and 35B protrude from the reception holes 45. This engages the balls 35A and 35B with the rectangular grooves 52. In this manner, the tip tool 50 is prevented from slipping off by the balls 35A and 35B and is connected integrally with the tool holder 10 in the rotational direction.

After the tip tool 50 is attached, the operation mode is selected with a change lever, and then the switch lever 15 is pressed. The switch 14 is turned on to drive the motor 4 and rotate the output shaft 5.

In the hammer mode, the rotation of the output shaft 5 is transmitted to the crank shaft 7. However, the rotation of the countershaft 8 is not transmitted from the bevel gear 13 to the tool holder 10. Thus, the eccentric pin 21 moves eccentrically to cause the piston 20 to reciprocate back and forth with the connecting rod 22. The striker 24 then reciprocates back and forth with the air chamber 23 between the piston 20 and the striker 24 to indirectly strike the tip tool 50 through the intermediate member 25. This allows the tip tool 50 to, for example, cut a workpiece.

In the hammer drill mode, the rotation of the output shaft 5 is transmitted to the crank shaft 7. The rotation of the countershaft 8 is transmitted from the bevel gear 13 to the tool holder 10. The tool holder 10 thus rotates. The tip tool 50 thus rotates and strikes.

In the drill mode, the crank shaft 7 does not rotate, and the rotation of the countershaft 8 is transmitted to the tool holder 10. Thus, the piston 20 does not reciprocate back and forth, and the tip tool 50 rotates and can, for example, drill a workpiece.

To detach the tip tool 50 from the tool holder 10, the operation sleeve 31 in the state shown in FIG. 3C is moved backward against an urging force from the coil spring 34. The pressure ring 32 is then pressed by the stopper 36 to also move backward. The guide washer 33 is then also moved backward. Thus, the pressure ring 32 moves to an unlocked position at which the enlarged-diameter portion 37 is outside the balls 35. As the tip tool 50 is pulled forward in this state, the balls 35 engaged with the rectangular grooves 52 are disengaged from the rectangular grooves 52 and move radially outward in the reception holes 45. This releases the tip tool 50, which has been prevented from being slipping off by the balls 35, to be detached.

In the hammer drill 1 according to the embodiment, the guide washer 33 (abutting member) has, on its surface facing the pressure ring 32, a projection 42 (projection) protruding toward the pressure ring 32. The projection 42 allows, at the locked position of the pressure ring 32, the guide washer 33 to be in the inclined posture in which the guide washer 33 is inclined with respect to the axis A of the tool holder 10 to allow the ball 35B to move more backward than the ball 35A.

This structure allows the two balls 35A and 35B to reliably retract to allow the tool holder 10 to smoothly receive the tip tool 50 inserted. The tip tool 50 is thus easily insertable.

The projection 42 is located on the front surface of the guide washer 33. This easily allows the guide washer 33 to be in the inclined posture.

The guide washer 33 is a circumferentially uniform disk excluding the projection 42. The guide washer 33 thus has a simple structure.

The guide washer 33 has a conical central portion serving as the receiver 40 that recedes toward its center. This structure allows the balls 35A and 35B to smoothly move backward.

The upper half 40B of the receiver 40 (a circumferential portion of the receiver 40) protrudes rearward to reduce the angle with the axis A of the tool holder 10. The upper half 40B having the projection 42 on its radially outward portion allows the ball 35B to move further backward. This structure allows the ball 35B to more reliably retract backward.

The conical receiver 40 is located in the central portion of the guide washer 33. The receiver 40 has the inner flat surface 41 (flat surface) on the outer circumference of the central portion. With the guide washer 33 having the projection 42, the pressure ring 32 can thus be urged stably.

An urging member to urge the guide washer 33 is the conical coil spring 34 having its diameter increasing frontward. This allows efficient transmission of an urging force in accordance with the shape of the guide washer 33.

The guide washer 33 has, on its outer circumference, the outer flat surface 43 (second flat surface) in contact with the front end of the coil spring 34. This stabilizes the guide washer 33 being urged.

Modifications of the present disclosure will now be described.

Figure 5A:
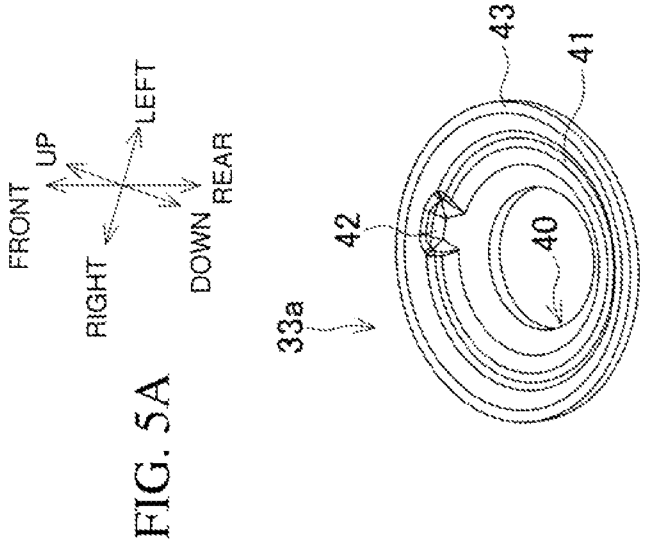
FIG. 5A is a front perspective view of a guide washer in a modification.
Figure 5B:
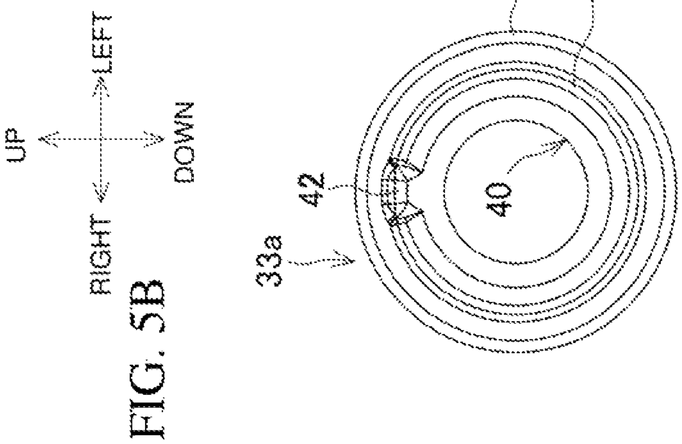
FIG. 5B is a front view of the guide washer in the modification.
Figure 5C:
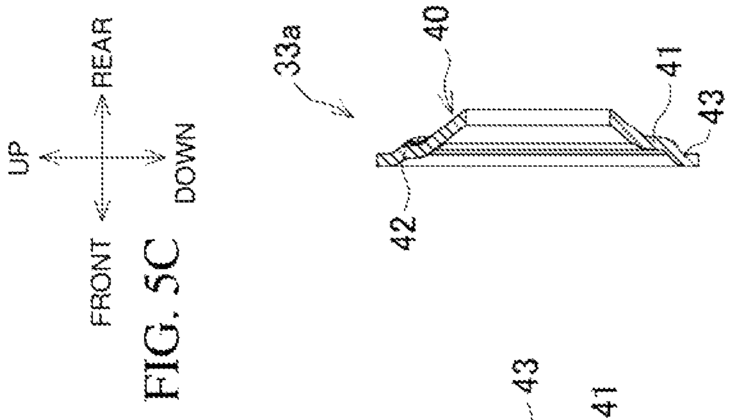
FIG. 5C is a longitudinal central sectional view of the guide washer in the modification.

A receiver may have a protrusion smaller than the half in the circumferential direction that allows the balls to move backward. The protrusion on the abutting member may be eliminated. For example, the conical receiver 40 may be circumferentially uniform, similarly to a guide washer 33*a* shown in FIGS. 5A to 5C. In this structure as well, the projection 42 allows the guide washer 33*a* to be in the inclined posture.

An entirely conical abutting member may be used rather than the abutting member simply having a conical central portion. The abutting member may be in a shape other than a cone (e.g., a spherical surface or a flat surface).

The abutting member may be integral with the tool holder in the rotational direction by applying an integration structure (e.g., a width across flats engagement) between them.

A projection may be shaped differently from the projection in the above embodiment. The projection may be a ridge elongated circumferentially. Multiple projections may be used.

The projection may be located on, rather than the abutting member, the rear surface of a pressure ring. Such a projection may also be shaped differently as appropriate. The pressure ring having partially a thicker portion, rather than the projection, may also incline the abutting member.

The projections may be located on both the abutting member and the pressure ring on their facing surfaces.

A coil spring may have a shape differently from a cone. An urging member other than the coil spring may be used.

Although the pair of reception holes and the pair of balls are located vertically in the tool holder in the above embodiment, another arrangement may be used. One or more embodiments of the present disclosure include other arrangements in which, for example, the reception holes and the balls may be located laterally in the tool holder or at different positions in the circumferential direction on the tool holder.

A hammer drill may use another striking assembly including, for example, a piston cylinder connected to an arm that is swingably mounted on a boss sleeve, which is mounted on a countershaft parallel to a tool holder. The piston cylinder reciprocates back and forth with the arm on the boss sleeve mounted with a swash bearing having a tilted axis.

A motor is oriented differently from the motor in the above embodiment. Another type of motor may be used.

Other operation modes may be used, rather than the three modes (the hammer mode, the hammer drill mode, and the drill mode) in the above embodiment. For example, the hammer drill mode and the hammer mode may be selectable.

The hammer drill may include a battery pack and operate on direct current (DC), rather than on alternating current (AC).

The striking tool that includes the attachment portion in the embodiment of the present disclosure is not limited to the hammer drill and may be an electric hammer simply including a striking assembly.

REFERENCE SIGNS LIST

1 hammer drill
2 body housing
3 motor housing
4 motor
5 output shaft
10 tool holder
17 larger-diameter portion

18 smaller-diameter portion
20 piston
24 striker
25 intermediate member
26 rubber stopper
30 attachment portion
31 operation sleeve
32 pressure ring
33, 33*a* guide washer
34 coil spring
35 ball
40 receiver
40A lower half
40B upper half
41 inner flat surface
42 projection
43 outer flat surface
45 reception hole
50 tip tool
51 tapered end
A axis of tool holder

What is claimed is:

1. A striking tool, comprising:

a tool holder being cylindrical and configured to receive a rear end of a tip tool at a front of the tool holder, the tool holder having a pair of reception holes extending radially;

two balls movable backward and forward in the pair of reception holes in an axial direction of the tool holder, the two balls being movable into and out of an area adjacent to an axis of the tool holder;

an abutting member being a ring, the abutting member being externally mounted on the tool holder in a manner movable backward and forward;

an urging member between the tool holder and the abutting member, the urging member urging the two balls forward in the reception holes with the abutting member;

a pressure ring externally mounted on the tool holder, the pressure ring being movable backward and forward, the pressure ring adjacent to a front of the abutting member, the pressure ring being urged forward by the urging member;

an operation sleeve externally mounted on the tool holder, the operation sleeve being movable backward and forward between a locked position being forward and an unlocked position being backward, at the locked position, the operation sleeve having an inner circumference of the operation sleeve in contact with the pressure ring, the pressure ring being located outside the two balls in front portions of the reception holes to cause the two balls to protrude toward the axis of the tool holder, and at the unlocked position, the operation sleeve allowing the pressure ring to move backward from a position outside the two balls to permit the two balls to retract from a protruding position at which the two balls protrude into the tool holder;

wherein the abutting member includes a projection facing the pressure ring, the projection being configured to cause, with the pressure ring at the locked position, the abutting member to be in an inclined posture with respect to the axis of the tool holder to allow a first ball of the two balls to move more backward than a second ball of the two balls.

2. The striking tool according to claim 1, wherein the projection is on a front surface of the abutting member.

3. The striking tool according to claim 2, wherein the abutting member is a circumferentially uniform disk excluding the projection.

4. The striking tool according to claim 3, wherein the abutting member includes at least a central portion being a conical portion receding toward a center of the abutting member.

5. The striking tool according to claim 4, wherein the conical portion of the abutting member includes a circumferential portion as a protrusion rearward to reduce an angle with the axis of the tool holder, the projection is radially outside the protrusion, and the protrusion allows the first ball to move backward.

6. The striking tool according to claim 5, wherein the abutting member includes the central portion being a conical portion, and a flat surface on an outer circumference of the central portion.

7. The striking tool according to claim 5, wherein the urging member includes a coil spring being conical and having a diameter of the coil spring increasing frontward.

8. The striking tool according to claim 7, wherein the abutting member has a second flat surface on an outer circumference of the abutting member, and the second flat surface is in contact with a front end of the coil spring.

9. The striking tool according to claim 4, wherein the abutting member includes the central portion being a conical portion, and a flat surface on an outer circumference of the central portion.

10. The striking tool according to claim 9, wherein the urging member includes a coil spring being conical and having a diameter of the coil spring increasing frontward.

11. The striking tool according to claim 10, wherein the abutting member has a second flat surface on an outer circumference of the abutting member, and the second flat surface is in contact with a front end of the coil spring.

12. The striking tool according to claim 4, wherein the urging member includes a coil spring being conical and having a diameter of the coil spring increasing frontward.

13. The striking tool according to claim 12, wherein the abutting member has a second flat surface on an outer circumference of the abutting member, and the second flat surface is in contact with a front end of the coil spring.

14. The striking tool according to claim 3, wherein the urging member includes a coil spring being conical and having a diameter of the coil spring increasing frontward.

15. The striking tool according to claim 14, wherein the abutting member has a second flat surface on an outer circumference of the abutting member, and the second flat surface is in contact with a front end of the coil spring.

16. The striking tool according to claim 2, wherein the urging member includes a coil spring being conical and having a diameter of the coil spring increasing frontward.

17. The striking tool according to claim 16, wherein the abutting member has a second flat surface on an outer circumference of the abutting member, and the second flat surface is in contact with a front end of the coil spring.

18. The striking tool according to claim 1, wherein the urging member includes a coil spring being conical and having a diameter of the coil spring increasing frontward.

19. The striking tool according to claim 18, wherein the abutting member has a second flat surface on an outer circumference of the abutting member, and the second flat surface is in contact with a front end of the coil spring.

20. A striking tool, comprising:

a tool holder being cylindrical and configured to receive a rear end of a tip tool at a front of the tool holder, the tool holder having a pair of reception holes extending radially;

two balls movable backward and forward in the pair of reception holes in an axial direction of the tool holder, the two balls being movable into and out of an area adjacent to an axis of the tool holder;

an abutting member being a ring, the abutting member being externally mounted on the tool holder in a manner movable backward and forward;

an urging member between the tool holder and the abutting member, the urging member urging the two balls forward in the reception holes with the abutting member;

a pressure ring externally mounted on the tool holder, the pressure ring being movable backward and forward, the pressure ring adjacent to a front of the abutting member, the pressure ring being urged forward by the urging member;

an operation sleeve externally mounted on the tool holder, the operation sleeve being movable backward and forward between a locked position being forward and an unlocked position being backward, at the locked position, the operation sleeve having an inner circumference of the operation sleeve in contact with the pressure ring, the pressure ring being located outside the two balls in front portions of the reception holes to cause the two balls to protrude toward the axis of the tool holder, and at the unlocked position, the operation sleeve allowing the pressure ring to move backward from a position outside the two balls to permit the two balls to retract from a protruding position at which the two balls protrude into the tool holder;

wherein the pressure ring includes a projection facing the abutting member, the projection being configured to cause, with the pressure ring at the locked position, the abutting member to be in an inclined posture with respect to the axis of the tool holder to allow a first ball of the two balls to move more backward than a second ball of the two balls.

* * * * *